Jan. 21, 1964 F. PETERSON 3,118,432
ROTARY INTERNAL COMBUSTION ENGINE
Filed Aug. 5, 1960 4 Sheets-Sheet 1
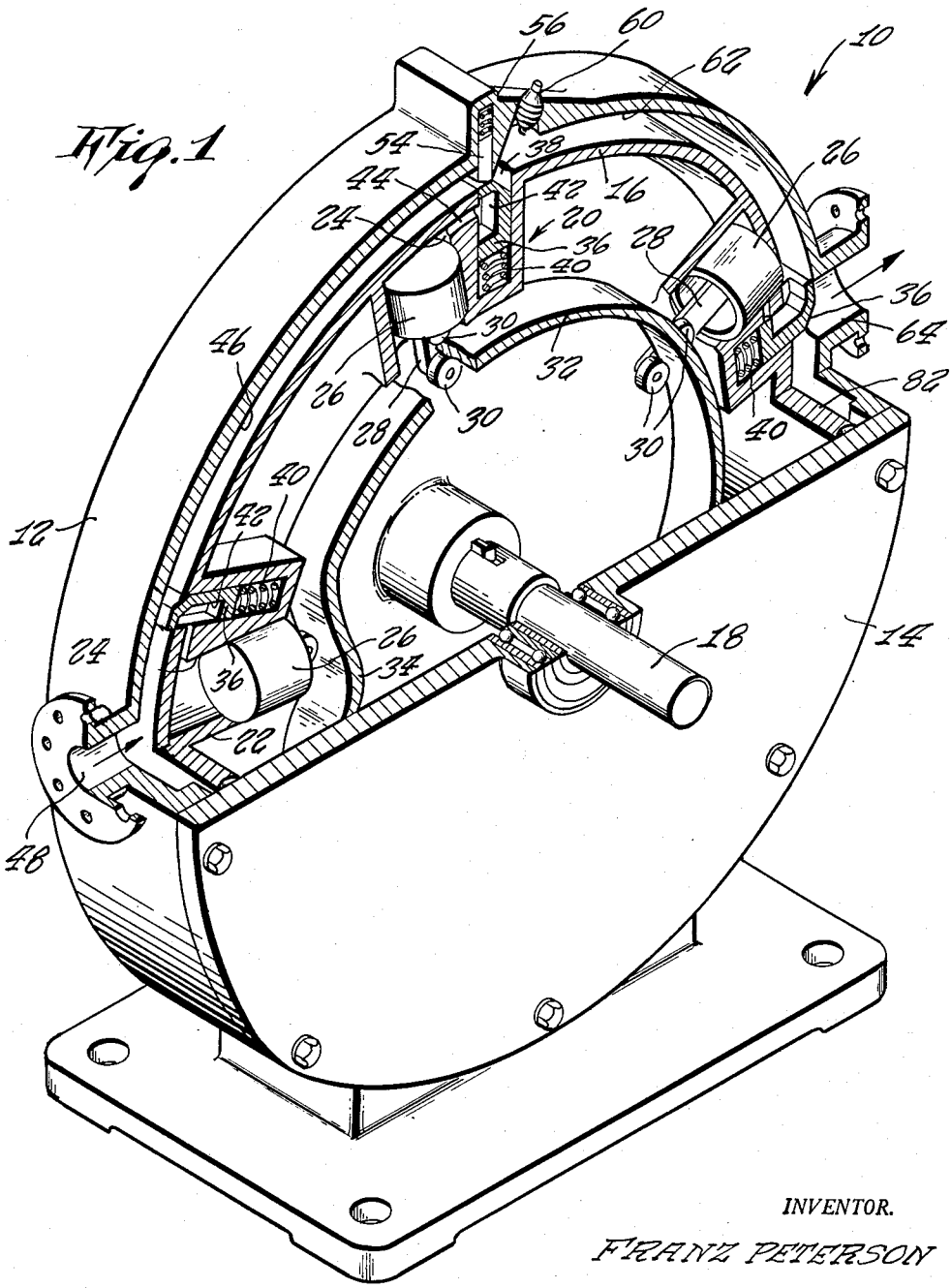
INVENTOR.
FRANZ PETERSON Jan. 21, 1964  F. PETERSON  3,118,432
ROTARY INTERNAL COMBUSTION ENGINE
Filed Aug. 5, 1960  4 Sheets-Sheet 2
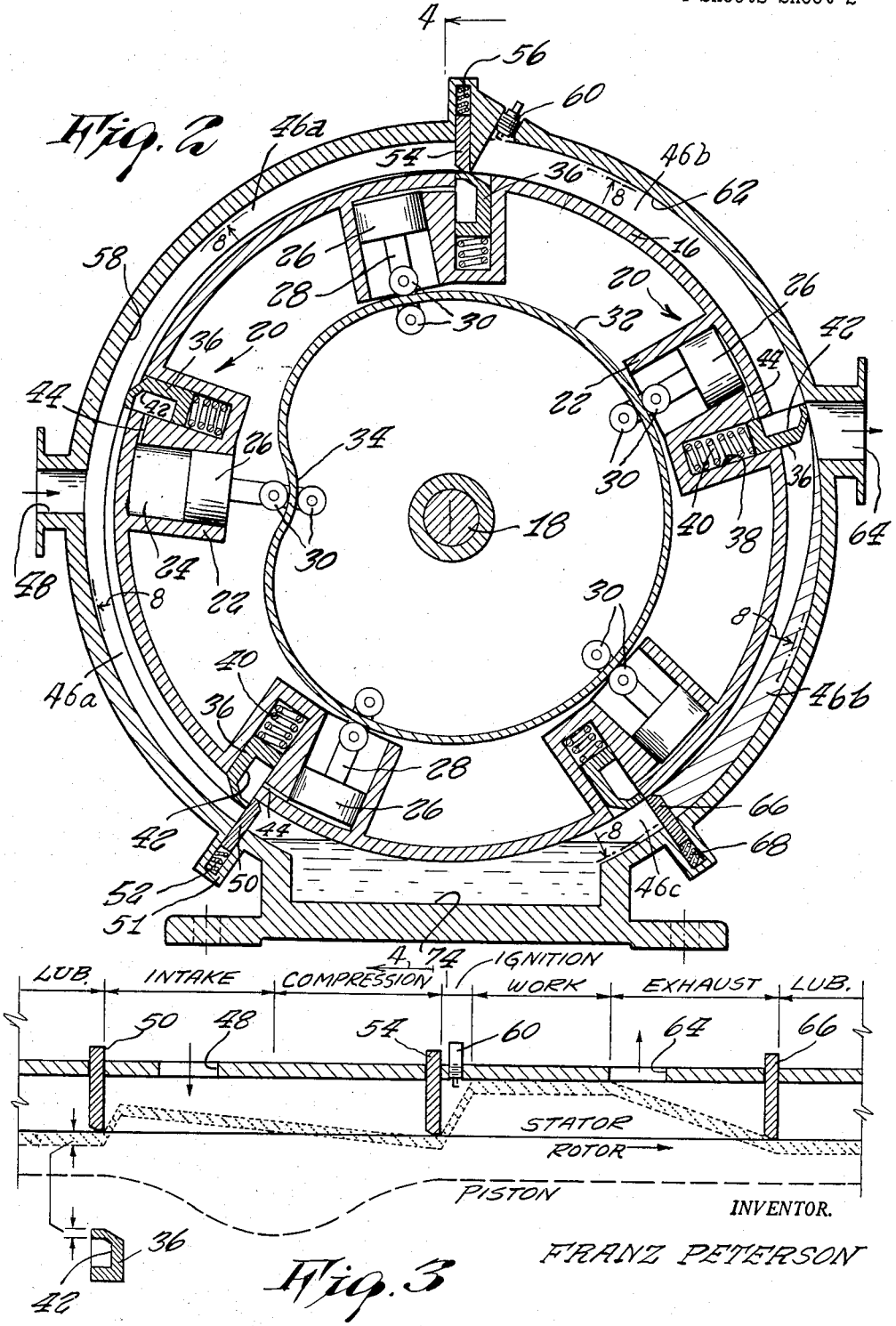
INVENTOR.
FRANZ PETERSON

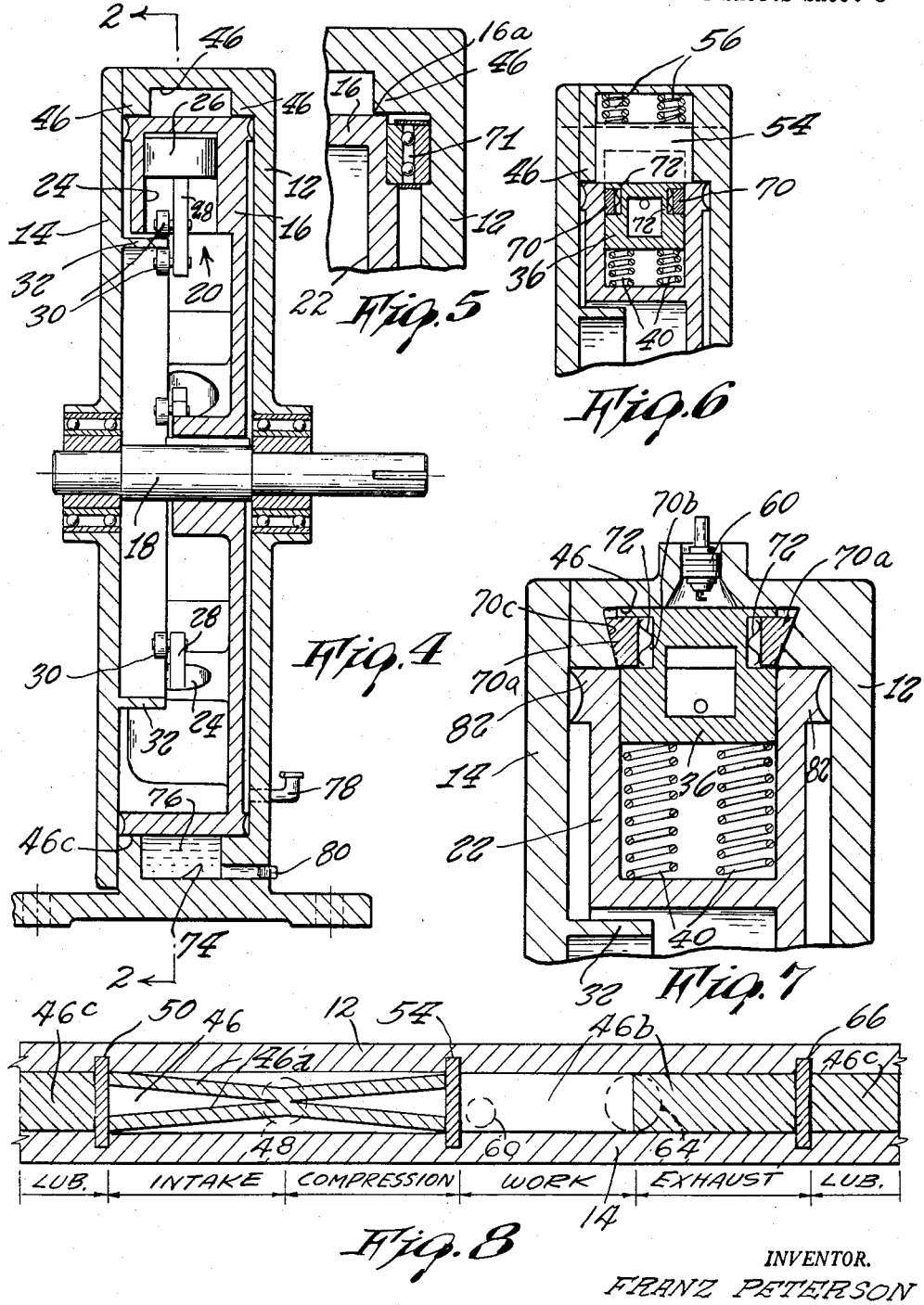

INVENTOR.
FRANZ PETERSON

United States Patent Office 3,118,432
Patented Jan. 21, 1964

3,118,432
ROTARY INTERNAL COMBUSTION ENGINE
Franz Peterson, 2501 Ditmars Blvd., Astoria, N.Y., assignor of twenty-five percent to Horace Tomasello, New York, N.Y.
Filed Aug. 5, 1960, Ser. No. 47,729
5 Claims. (Cl. 123—16)

This invention relates to internal combustion engines and, more particularly, to a rotary internal combustion engine.

It is an object of the present invention to provide a multi-stage internal combustion engine of the rotary type which is extremely efficient, smooth in operation, and which can be readily maintained for prolonged use over extended periods of time.

A further object of the present invention is to provide an air cooled rotary internal combustion engine having self contained lubricating sump and individually circumferentially spaced apart combustion units controlled during the entire rotation of the rotor to pass through a series of compression, combustion, exhaust, and lubricating stages to provide for a continuous and uninterrupted flow of power to the drive shaft.

Still an addition object of the present invention is to provide a rotary type internal combustion engine of the type described which is of basically simple design, durable, and easily maintained for various types of purposes.

Still a further object of the present invention is to provide an especially designed rotary internal combustion engine where the bearings are especially designed to minimize wear, provide for all types of drive purposes, and which is extremely highly efficient in operation.

All of the foregoing and still further objects and advantages of this invention will become apparent from a study of the following specification, taken in connection with the accompanying drawing, wherein:

FIGURE 1 is a perspective view, with parts broken away, of a single rotor rotary internal combustion engine made in accordance with the present invention;

FIGURE 2 is a longitudinal cross sectional view of the engine shown in FIGURE 1;

FIGURE 3 is a layout plan view illustrating the various stages of the engine shown in FIGURES 1 and 2;

FIGURE 4 is a transverse cross sectional view of the engine shown in FIGURES 1 and 2;

FIGURE 5 is a fragmentary cross-sectional view of a modification of FIGURE 4, showing in particular a roller bearing contact between the rotor 16 and the housing 12;

FIGURE 6 is a radial cross-sectional view through the housing and the rotor on a radial line through the valve chamber, showing in particular details of the slide valve in the chamber;

FIGURE 7 is a similar enlarged fragmentary cross-sectional view as FIGURE 6, showing a modification of FIGURE 6, in connection with the specific form of sealing means employed between the housing and the valve assembly;

Figure 9:
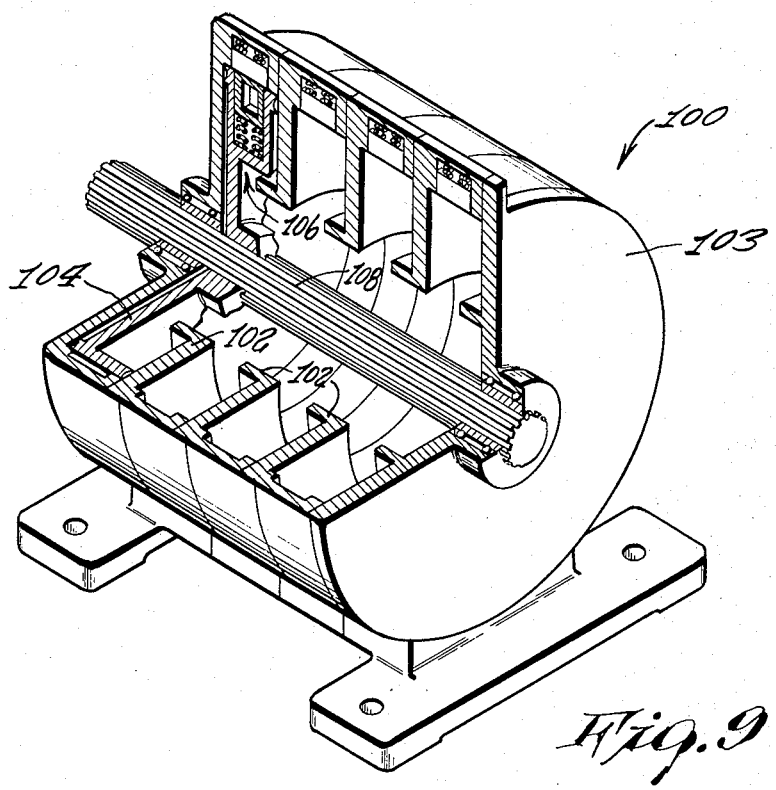
Figure 10:
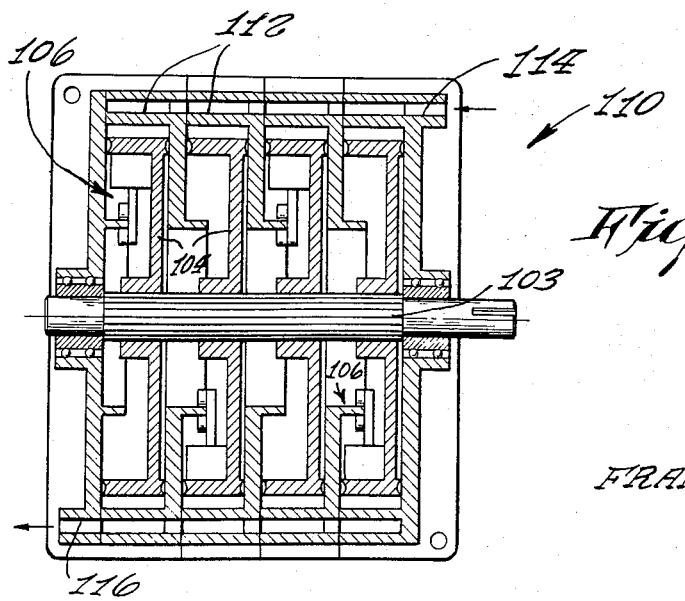

FIGURE 8 is a developed plan view of the interior of the housing 22, showing in particular the guide tracks and guide areas 46a 46b, and 46c, which control the radial movement of the slide valves;

FIGURE 9 is a perspective view, with parts broken away, of a multi-rotor rotary combustion engine made in accordance with a modified form of the present invention; and FIGURE 10 is a longitudinal cross sectional view of a multi-rotor rotary combustion engine similar to that shown in FIGURE 9 but equipped with water cooling apparatus.

Referring now to the drawing, and more particularly to FIGURES 1 to 3 thereof, a rotary internal combustion engine 10 made in accordance with one form of the present invention is shown to include a stationary main housing 12 having an end plate 14 completely enclosing the interior thereof. A rotor 16 secured upon a drive shaft 18, is rotatably supported within the interior of the main housing 12 for rotation substantially concentrically with the outer wall thereof.

Carried upon the rotor 16, in circumferentially spaced apart relationship, are a plurality of combustion units 20. Each combustion unit 20 includes a housing 22 having a cylinder 24 within which a piston 26 is slidably supported for reciprocating longitudinal movement. Each piston 26 is provided with a piston rod 28 having a pair of spaced apart follower rollers 30 that are rollably engaged on opposite sides of a control guide cam 32 that is substantially concentric with the drive shaft 18 around the entire periphery thereof, except for one portion 34 immediately adjacent to the fuel intake manifold 48 of the housing 12. At this point of the control guide cam 32, the indent 34 effects the inward movement of the piston 26 to draw fuel into the interior of the chamber 24 past the slide valve 36 that is slidably supported within a slide valve housing of the combustion unit housing 22, and which slide valve 36 is yieldably urged toward an open position by means of compression coil springs 40 disposed within the housing section 38 thereof. Each slide valve 36 is provided with its own chamber 42, for purposes hereinafter more fully described, which chamber 42 communicates with the interior of the cylinder 24 through a port 44.

A first divider 50, in the form of a plate slidably carried upon a radially outwardly extending housing 51 of the main housing 12, is yieldably urged by means of compression coil springs 52 into sliding contact with the periphery of the rotor 16. This divider 50 cooperates with a second divider 54, similarly slidably carried by the main housing 12 at a circumferentially spaced apart point and yieldably urged inwardly by means of compression coil springs 56, to define a first compression section 58 within the annular space between the rotor 16 and the interior of the housing 12.

A first set of guide tracks 46a carried upon the interior of the main housing 12 are slidably engaged by the slide valves 36 from the first divider plate 50 to the second divider plate 54, to slowly move the slide valve 36 from the opened position in the compression section 58 after the chamber 42 of the slide valve 36 has received its distribution of fuel, so that upon reaching the second gate plate 54, the slide valve 36 is completely closed blocking communication between the interior of the chamber 24 and the interior of the annular space between the rotor and housing. During the rotation of the particular combustion unit from a point adjacent to the intake manifold 48, at which point the indent 34 in the cam plate 32 has the piston 26 in the fully withdrawn position, to the second divider plate 54, at which point the cam plate 32 has caused the piston 26 to move to a fully compressed position, the fuel taken into the slide valve and chamber 24 is fully compressed.

Immediately after passing beyond the second divider plate 54, the slide valve 36 is permitted to snap out to a fully open position, to allow the compressed gases to expand into the combustion section 62, at which time a sparkplug 60 is energized to ignite the fuel, to thus drive the rotor through the outwardly extended slide valve 36 in the direction of rotation of the rotor. After the outwardly extended slide valve 36 has passed the exhaust manifold 64, the exhaust gases are permitted to discharge outwardly, and the second section 46b of the guide plate acts upon the slide valve 36 to return it to an inwardly disposed position as it approaches a third divider plate 66 having activating springs 68. The respective combustion unit is then directed through a lubricating oil sump 74 filled with lubricating oil 76, and having a filler pipe 78 and drain plug 80.

Reference is made to FIGURE 3 of the drawing which graphically depicts the cyclic movement of the combustion of the engine as related to the radial reciprocatory motion of the slide valves 36 and piston 26 during a complete cycle. Reference is also made to FIGURE 8, which shows guide elements 46a, 46b and 46c, which bear against the slide valves 36, to cause them to assume predetermined desired radial positions within their chambers. It is to be noted (see FIGURE 2) that the guide elements both vary in radial depth and axial thickness and configuration. FIGURE 8 in particular, shows the variation in the axial width of the guide elements, and also their configuration about the interior face of the housing 12. It is further to be noted that at various locations, the guide elements project inwardly from the interior face of the housing, and that other locations are flush with the interior face of the housing (see profile of the guide elements in FIGURE 2). The portion of the guide elements between divider plates 50 and 54, which is the intake and compression portions of the cycle, are designated as 46a, and as is seen, comprise two divergent strips which appear to merge midway between 50 and 54 at the intake port 48. The purpose of this divergence is to distribute frictional wear along all portions of the slide valve contact surface. However, it should be realized that the particular pattern shown in FIGURE 8, that is, converging at the intake port 48, is merely one pattern to cause distribution of wear and tear. Other patterns may be employed without departing from this invention, and indeed, it should also further be noted that the guide elements should not substantially block intake port 48, inasmuch as this would interfere with the operation of the motor. The divider element between divider plates 54 and 66, is flush with the interior face of the housing and extends the full width of the valves, and is designated as 46b. It is further to be seen in FIGURE 8, that the guide elements extend also between divider plate 66 and 50, and pass through oil sump 74, as indicated in FIGURE 8. This particular portion of the guide element is designated as 46c, and is of variable width in order again to distribute wear and tear over the housing and the valve surfaces. It is to be noted that the guide element area between plates 66 and 50, are of maximum radial depth in order to retain the valves 36 wholly within their chambers during passage through the oil sump, for purposes of lubrication. Immediately after leaving the oil sump area, the guide elements reduce in radial depth to the minimum depth indicated in FIGURE 2, as 46a.

A modification of FIGURE 4 is depicted, wherein the rotor 16 and the housing 12 is provided with a ball-bearing assembly 71, which maintains an accurate concentric rotary position for the rotor in its rotation about the shaft relative to housing 12. FIGURE 5 is an enlarged portion of the right hand portion of FIGURE 4, excepting that it includes a modified form of bearing contact between the rotor and the housing. It is quite obvious that other conventional forms of bearing contact could be employed with equal success. It is to be noted however, that a portion 16a of the periphery of the rotor, is snugly fitted within the guide elements 46.

FIGURES 6 and 7 show modified forms of the slide valve assembly and the housing 12. In FIGURE 6, each slide valve 36 is provided with a gasket element 70 biased outwardly by means of leaf spring 72 against the walls of the valve chambers 22 to provide a pressure-tight fit. It is to be noted that the said gasket 70 will be urged to a sealing position against the housing 12 when the valves 36 are in a position radially outward of their chambers; thus the sealing gasket 70 will prevent leakage of gas pressure past the valves during combustion to provide a more efficient thrust. In FIGURE 6, gaskets 70 are so designed that they will be retained in the recess of the valves during reciprocation between valve chamber and the housing space adjacent the valve chamber. In FIGURE 7, a specific method of accomplishing the retention of the sealing gaskets on the slide valve, is depicted. Gaskets 70a, of trapezoidal shape, are shown housed within recesses 70b, and urged outwardly by springs 72, as in FIGURE 6. To co-act properly with the trapezoidal shape of gasket 70, the housing 12 is provided with inwardly diverging faces 70c which slopes towards the interior face of the slide valve chamber. Consequently, when gaskets are moved outward of the valve chamber, they will be pressed yieldably and sealingly against the faces 70c of the housing, and upon return of the valve into its chamber, the converging faces 70c of the housing 12 will ease the gaskets back into the valve chamber.

FIGURE 6 also illustrates the manner in which the divider plate 54 maintains a snug sliding fit within the radial outwardly disposed surface of the rotor 16 and the respective surface of the slide valve 36. It is to be noted that the other divider plates 66, 50, etc. operate in a similar fashion. The respective activating springs of each of the divider plates, serves to maintain the sliding plates in full sliding contact with the rotor and auxiliary parts at all times, thus maintaining completely separate sections of the housing required for the compression, combustion and exhaust sequences required for a cycle.

Reference is now made to FIGURE 9 of the drawing, which illustrates an engine 100 having a plurality of rotor sections, each such section having a stator 102, a rotor 104, and each rotor 104 having a plurality of combustion units 106 similar to those hereinbefore described. In this embodiment of the present invention, additional stator and rotor units may be added simply by removing the end plate 103 and adding the adidtional stators in line with the common drive shaft 108 that is carried by the respective rotors 104. In view of this basically simple construction, it is possible to enlarge the engine whenever desired to suit speical power requirements.

In FIGURE 10 of the drawing, a rotary internal combustion engine similar to that shown in FIGURE 9, is shown in the form of a water cooled unit 110 having individual stator sections provided with ducts 112 through which water may be circulated from an inlet 114 to an outlet 116. Except for this water cooling provision, this form of the present invention 110 is substantially identical to that of the engine 100 shown in FIGURE 9. The engine shown in FIGURE 9 is substantially identical in operation to the engine shown in FIGURES 1 to 8 of drawing, except for the multi-rotor and stator sections which simply increase the capacity of the engine in multiples of the number of stator and rotor units employed.

While this invention has been described with particular reference to the construction shown in the drawings, it is to be understood that such is not to be construed as imparting limitations upon the invention, which is best defined by the claims appended hereto.

Having thus described my invention, I claim as new and desire to secure by Letters Patent:

1. A rotary internal combustion engine comprising stationary main housing having a substantially cylindrical inner surface, a rotor having a drive shaft rotatably concentrically supported by said main housing, said rotor having a substantially cylindrical outer surface and defining an annular space between said rotor and said housing, a plurality of circumferentially spaced apart combustion units carried by said rotor, each said unit having a compression chamber, a piston slidably carried within each said chamber, a vane slidably carried by each said combustion unit, in a radially arranged slot in said rotor, adjacent said chamber, a guide carried by the inner surface of said housing acting upon said vane to cause said vane to move radially inward of said slot and a spring biasing the said vane outward, said vane being in sealing contact with the inner surface of said housing when moved fully outward of its slot, a passage between said compression chamber and said slot, a valve chamber in said vane, said valve chamber establishing communication between said compression chamber and said annular space when said vane has moved partially or fully outward of its slot but preventing communication between said compression chamber and said annular space when said vane has moved fully inward of its slot, a plurality of circumferentially spaced apart dividers carried by said housing dividing said annular space into a fuel intake and compression section, a combustion and exhaust section, and a lubricating section; a fuel intake communicating with said fuel intake and compression section, an exhaust communicating with said combustion and exhaust section, ignition means communicating with said combustion section, cam means for controlling the position of said piston in said compression chamber, said guide and said cam being arranged such that (1) as each said combustion unit passes through said fuel intake section, said vane is partially outward of its slot and said piston moves to draw fuel into said compression chamber, (2) as each said unit passes through said compression section said vane is fully inward of its slot and said piston moves to compress the fuel in said compression chamber, (3) as each said unit passes through said combustion section, said vane being fully outward of its slot and the compressed mixture being transferred to said section and ignited while said piston does not move in said compression chamber, (4) as each unit passes through said exhaust section, said vane being gradually moved to fully inward of its slot, and (5) as each unit passes through said lubricating section, said vane remaining fully inward of its slot.

2. A rotary internal combustion engine, as in claim 1, wherein each said combustion unit comprises a radially extended chamber.

3. A rotary internal combustion engine, as in claim 2, wherein the said means for controlling the movement of the said pistons comprise a stationary cam surface affixed to the housing, and cam followers engaging said cam surface, each cam follower being integrally connected with each piston along a radial line.

4. A rotary internal combustion engine, as in claim 3, wherein each of said dividers comprises a divider plate radially slidably carried on said housing and extending radially inward in said annular space between the rotor and the housing in combination with springs biasing said plates inwardly against the rotor, said divider plates being sealingly fitted within the housing walls.

5. A rotary internal combustion engine, as in claim 4, wherein said vane includes sealing gaskets interposed between its slot and the said slide valve, including means forcing said gaskets outwardly against the walls of said slots.

References Cited in the file of this patent
UNITED STATES PATENTS

| | | |
|---|---|---|
| 897,260 | Luther | Aug. 25, 1908 |
| 984,061 | Augustine | Feb. 14, 1911 |
| 1,202,828 | Ginn | Oct. 31, 1916 |
| 1,217,733 | Femons | Feb. 27, 1917 |
| 1,247,973 | Langtieg | Nov. 27, 1917 |
| 1,434,446 | McQueen | Nov. 7, 1922 |
| 1,602,018 | Harvey | Oct. 5, 1926 |
| 1,828,228 | Kempton | Oct. 20, 1931 |
| 2,189,728 | Daniels | Feb. 6, 1940 |
| 2,263,275 | Pieper | Nov. 18, 1941 |
| 2,350,005 | Wilcoxson | May 30, 1944 |
| 2,821,176 | Koser | Jan. 28, 1958 |

FOREIGN PATENTS

| | | |
|---|---|---|
| 615,813 | France | Oct. 18, 1926 |
| 806,689 | France | Sept. 28, 1936 |
| 1,157,816 | France | Jan. 6, 1958 |